United States Patent [19]

Ohmi et al.

[11] 4,066,997

[45] Jan. 3, 1978

[54] FLUID LEVEL INDICATOR FOR TANDEM MASTER CYLINDER

[75] Inventors: Atsushi Ohmi, Anjo; Masayoshi Katagiri, Toyota, both of Japan

[73] Assignees: Aisin Seiki Kabushiki Kaisha; Toyota Jidosha Kogyo Kabushiki Kaisha, both of Japan

[21] Appl. No.: 698,113

[22] Filed: June 21, 1976

[30] Foreign Application Priority Data

June 23, 1975 Japan .................................. 50-77743

[51] Int. Cl.² ........................................... G08B 21/00
[52] U.S. Cl. .................................. 340/59; 340/244 E; 200/84 C; 73/DIG. 5; 73/308
[58] Field of Search ................. 340/59, 244 A, 244 E, 340/244 R; 200/84 C; 116/109, 110, 118 R; 73/307, 308, 311, 313, DIG. 5

[56] References Cited

U.S. PATENT DOCUMENTS

| | | | |
|---|---|---|---|
| 3,603,926 | 9/1971 | Kimura | 340/59 |
| 3,680,044 | 7/1972 | Tsubouchi | 340/59 |
| 3,922,657 | 11/1975 | Hayashida et al. | 340/244 B |
| 3,947,813 | 3/1976 | Uemura et al. | 340/59 |

Primary Examiner—John W. Caldwell, Sr.
Assistant Examiner—Joseph E. Nowicki
Attorney, Agent, or Firm—Oblon, Fisher, Spivak, McClelland & Maier

[57] ABSTRACT

A dual fluid reservoir for a tandem master cylinder includes front and rear fluid chambers communicated to each other and comprises a lateral partition provided within the casing of the reservoir to block free fluid communication between the two chambers after the fluid level within the chambers drops below a lowest level defined by the lateral partition, and an annular partition provided on the lateral partition to form a float chamber therein, the annular partition being higher than the lateral partition in a predetermined length and including a pair of recessed portions corresponding to the lateral partition to permit fluid flow from the two fluid chambers into the float chamber. Thus, a magnetically operable switch device is mounted on the casing between the two chambers to actuate a warning device and a float is disposed within the float chamber for vertical movement and operatively connected to the switch.

4 Claims, 5 Drawing Figures

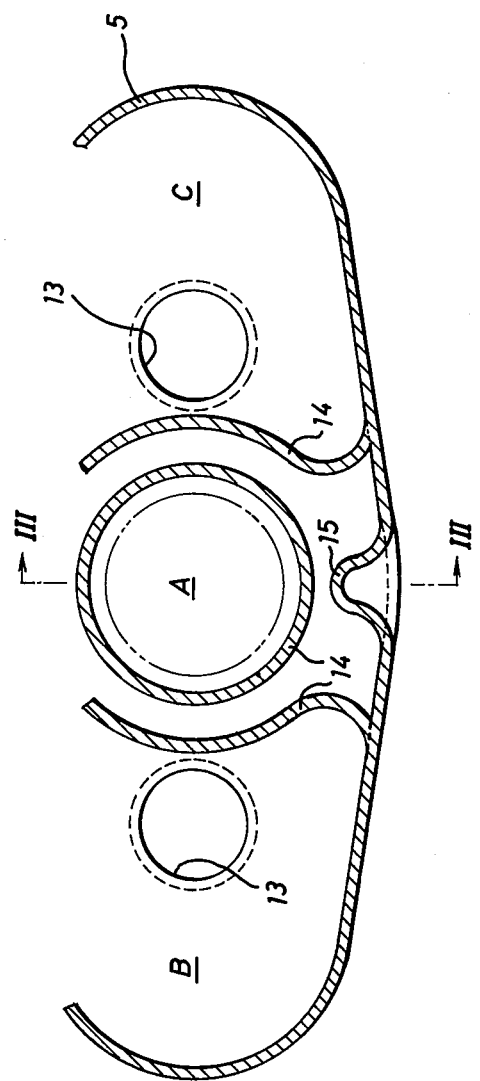

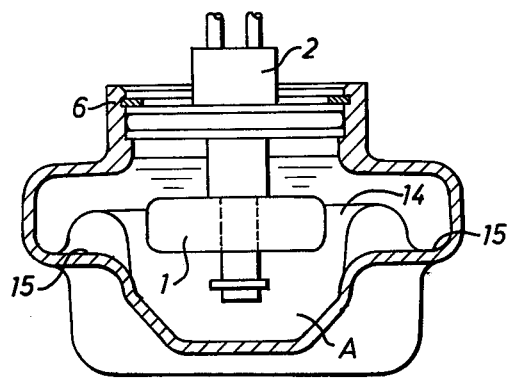
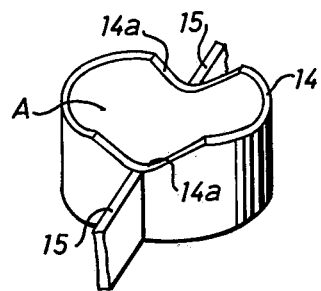
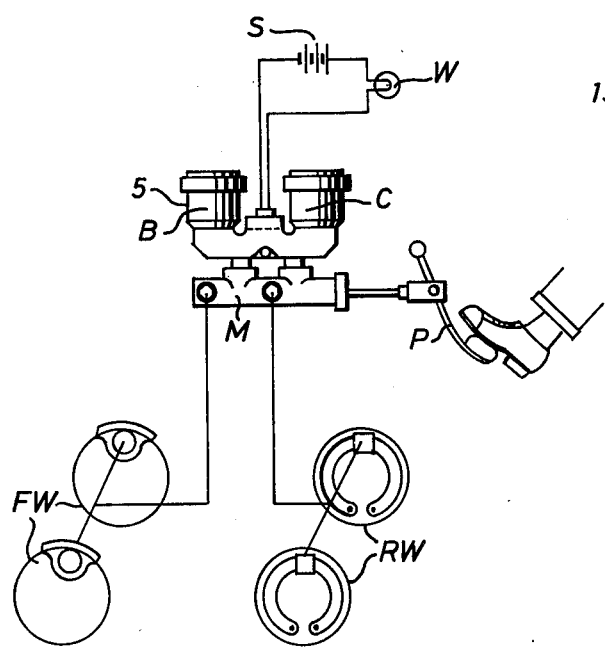

FLUID LEVEL INDICATOR FOR TANDEM MASTER CYLINDER

BACKGROUND OF THE INVENTION

The present invention relates to a fluid reservoir for a tandem brake master cylinder, and more particularly to a fluid level indicator for the fluid reservoir which includes front and rear fluid chambers.

Nowadays, a brake master cylinder is provided with a fluid level indicator which comprises a float disposed within a fluid reservoir for vertical movement in response to variation of the fluid level and a magnetically operable switch means operatively connected to the float to actuate a warning device upon closing of the switch means. With this fluid level indicator, when the fluid level drops below a predetermined lowest one, an alarm is issued from the warning device to let the driver supply brake fluid so as to prevent any possible accident caused by operational failure of the brake system due to shortage of the brake fluid.

To adapt the fluid level indicator to a dual fluid reservoir of a tandem master cylinder, front and rear fluid chambers of the reservoir are connected to each other to provide free communication while the fluid levels in the chambers are kept over a predetermined lowest level and, thus, a single fluid level indicator is provided on a portion where the two fluid chambers are closest to each other.

In use of the fluid level indicator of this type, if the fluid reservoir is inclined in accordance with inclination of the vehicle body, an amount of brake fluid flows from one fluid chamber into the other fluid chamber to decrease the fluid level in either of the two fluid chambers lower than the actual fluid level. This causes a false operation of the fluid level indicator.

SUMMARY OF THE INVENTION

To avoid the abovementioned drawback, the present invention is directed to provide an improved dual fluid reservoir which comprises a casing defining front and rear fluid chambers therein to store brake fluid, the two fluid chambers being communicated to each other. The fluid reservoir includes a lateral partition provided within the casing to block free fluid communication between the two chambers after the fluid level within the chambers drops below a predetermined lowest level defined by the lateral partition, an annular partition provided on the lateral partition between the two fluid chambers to form a float chamber therein, the annular partition being higher than the lateral partition in a predetermined length and including at least a recessed portion corresponding to the lateral partition to permit fluid flow from the two fluid chambers into the float chamber, a float disposed within the float chamber for vertical movement in response to variation of the fluid level within the fluid chambers, and a magnetically operable switch means mounted on the casing between the two chambers and operatively connected to the float, whereby the switch means is closed to actuate a warning device when the fluid level within the two fluid chambers drops below the predetermined lowest level to move down the float.

BRIEF DESCRIPTION OF THE DRAWING

Additional objects and advantages of the present invention will be more readily apparent from the following detailed description of a preferred embodiment thereof when taken together with the accompanying drawings in which:

FIG. 2 is a cross-sectional view taken along line II — II of FIG. 1;

FIG. 3 is a right side view of a cross-section taken along line III — III of FIG. 2;

FIG. 4 illustrates a brake system wherein the embodiment of FIG. 1 is assembled with a tandem master cylinder; and FIG. 5 is a schematic illustration of a float chamber shown in FIG. 1.

DESCRIPTION OF THE PREFERRED EMBODIMENT

Figure 1:
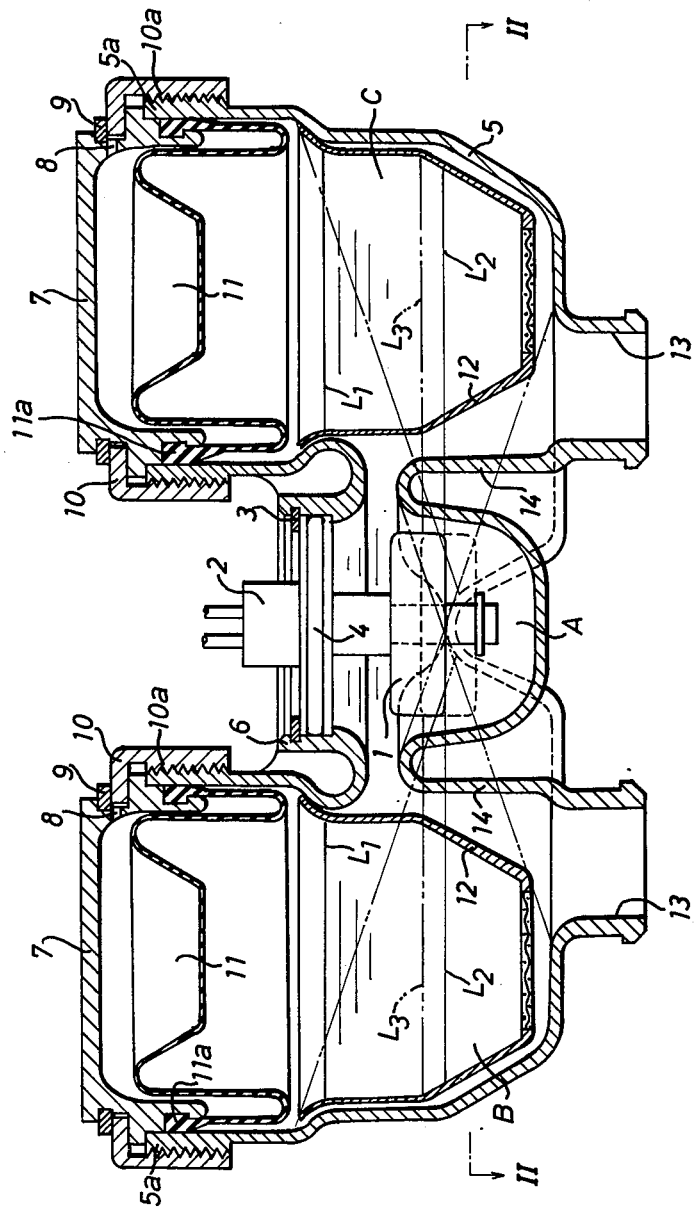
FIG. 1 illustrates a vertical cross-section of a preferred embodiment of the present invention.

Referring now to the accompanied drawings, particularly to FIG. 1, there is illustrated a fluid reservoir for a tandem brake master cylinder M of a vehicle. The master cylinder M is actuated by a brake pedal P, as shown in FIG. 4, and has front and rear pressure chambers to apply braking pressure to front and rear wheel cylinders FW and RW respectively.

The fluid reservoir includes an annular casing 5 which is separated into front and rear fluid chambers B and C by means of an annular partition wall 14 and a pair of lateral patitions 15. The annular partition 14 defines a well or float chamber A between the fluid chambers B and C, which are aligned longitudinally along the vehicle body and communicated through bores 13 to the interior of the master cylinder M. The front and rear chambers B and C are communicated to each other through the float chamber A; the communication structure will be explained with reference to FIGS. 2 and 3 hereinafter.

As well observed in FIG. 3, which is a right side view of a cross-section taken along line III — III of FIG. 2, the front and rear chambers B and C are communicated to each other through an annular space around the partition wall 14. As best observed schematically in FIG. 5, the annular partition 14 is higher than the lateral partitions 15 in a predetermined length and provided with a pair of recessed portions 14a at the opposite sides crossing the lateral partitions 15, the bottoms of the recessed portions 14a corresponding to the upper surfaces of the lateral partitions 15.

Referring back to FIG. 1, within the well A a float member 1 is positioned to float on brake fluid stored within the front and rear chambers B and C. The float member 1 is operatively connected at its top end with a magnetically operable switch 2 which is connected to an electric circuit including an electric source S and a warning lamp W to issue an alarm at a dangerous decrease in the quantity of the brake fluid, as shown in FIG. 4. The switch means 2 is fixedly mounted on an annular neck 6 of the casing 5 through a seal ring 4 to seal the float chamber A and prevented from moving out of the assembled position by a retainer ring 3.

Each opening neck portion 5a of the front and rear chambers B and C is air-tightly closed by a cap 7 which is detachably fixed to the neck portion 5a by means of a fastening cap 10. The cap 7 is rotatably assembled by a retainer ring 9 with the fastening cap 10, which is threaded over the outer circumferential wall of the neck portion 5a of the casing 5. Within each interior of the front and rear chambers B and C a diaphragm seal member 11 is air-tightly connected at its bead 11a with the inner end of the cap 7 and a strainer element 12 is housed. Thus, the brake fluid stored within the chambers B and C is perfectly sealed by the intervention of the bead 11a of the diaphragm 11 and a chamber formed between the diaphragm 11 and the inner wall of the cap 7 is communicated to the atmospheric air through a vent hole 8 provided on the cap 7.

In use of the fluid reservoir, brake fluid is filled within the front and rear fluid chambers B and C to maintain a predetermined high level $L_1$. If after succesive operations of the master cylinder M the fluid level in the chambers B and C should happen to drop below a predetermined lowest level $L_2$ defined by the upper surface of the lateral partition walls 15, the float member 1 will move down, as shown by dotted lines in FIG. 1, to close the magnetically operable switch 2. This energizes the electric circuit to light the warning lamp W so as to issue an alarm to the driver.

When the fluid level is higher than the lowest level $L_2$, as shown by an imaginary line $L_3$ in FIG. 1, the float member 1 does not move down and the switch 2 is maintained in its open attitude. In this instance, if the vehicle body inclines at an angle, the fluid level will take an angle in accordance with the inclination of the vehicle body, but the float 1 does not still move down since the annular partition wall 14 is higher than the lateral partition walls 15 except at the recessed portions 14a to receive a predetermined quantity of fluid therein, as shown by inclined imaginary lines in FIG. 1. In this embodiment, it is assumed that the vehicle body is inclined up to 22°. Thus, the recessed portions 14a are formed respectively in a V-shape to have the inclined angle.

By the way, assuming that the annular partition wall 14 corresponds to the bottoms of the recessed portions 14a, as usually seen with conventional devices of the type, the fluid level within the float chamber A becomes lower than the level shown with the inclined imaginary lines. As a result, even when the fluid level is higher than the lowest level $L_2$, the float member 1 will move down to close the switch 2. This causes issuance of false warning.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a tandem master cylinder having a casing defining front and rear fluid chambers therein to store an amount of brake fluid, said fluid chambers being in fluid communication to each other;
   a lateral partition provided within said casing between said two fluid chambers to block the relative fluid communication between said fluid chambers after the fluid level within both said chambers drops below a predetermined lowest level defined by said lateral partition;
   an annular partition provided on said lateral partition between said two fluid chambers to form a float chamber therein, said annular partition being higher than said lateral partition in a predetermined length and including at least a recessed portion adjacent to said lateral partition to permit fluid flow from said two chambers into said float chamber, the bottom of said recessed portion corresponding to an upper surface of said lateral partition to block fluid communication between said two chambers and said float chamber after the fluid level within said float chamber drops below said predetermined lowest level;
   switch means mounted on said casing between said two chambers and adapted to actuate a warning device upon closing of said switch means; and
   a single float disposed within said float chamber for vertical movement in response to variation of the fluid level within said chambers and operatively connected to said switch means;
   whereby said switch means is closed to actuate said warning device only when the fluid level within said fluid chambers drops below the predetermined lowest level.

2. The invention as claimed in claim 1, wherein said annular partition includes a pair of recessed portions crossing said lateral partition to permit fluid flow from said two fluid chambers into said float chamber.

3. The invention as claimed in claim 1, wherein said lateral partition and said annular partition are integrally provided on the bottom portion of said casing and wherein said front fluid chamber is communicated with said rear fluid chamber through an annular space around said annular partition.

4. The invention as claimed in claim 1, wherein said master cylinder is operatively associated with a vehicle and said recessed portion is formed in a V-shape defined by an inclination degree of the vehicle body.

* * * * *